United States Patent [19]
O'Rourke

[11] Patent Number: 5,713,392
[45] Date of Patent: Feb. 3, 1998

[54] LOW FRICTION SLIP-SLEEVE PIPE WRAP

[75] Inventor: Thomas D. O'Rourke, Ithaca, N.Y.

[73] Assignee: Cornell Research Foundation, Inc., Ithaca, N.Y.

[21] Appl. No.: 834,247

[22] Filed: Apr. 15, 1997

Related U.S. Application Data

[63] Continuation-in-part of Ser. No. 534,631, Sep. 27, 1995, abandoned.

[51] Int. Cl.$^6$ .................................................... F16L 11/00
[52] U.S. Cl. ........................... 138/125; 138/140; 138/137
[58] Field of Search ................................. 138/123–125, 138/103, 105, 97, 99, 140, 137, 139; 405/38, 270

[56] References Cited

U.S. PATENT DOCUMENTS

| | | | |
|---|---|---|---|
| 4,338,044 | 7/1982 | Titus | 405/172 |
| 4,749,306 | 6/1988 | Demeny et al. | 405/45 |
| 4,983,449 | 1/1991 | Nee | 428/252 |
| 5,056,960 | 10/1991 | Marienfeld | 405/270 |
| 5,176,025 | 1/1993 | Butts | 73/40.5 |
| 5,501,753 | 3/1996 | Stark | 156/70 |

OTHER PUBLICATIONS

Ligon, J.B. et al, Coefficient of friction for pipe coating materials, Pipe Line Rules of Thumb Handbook, (1993) pp. 157–159.

*Primary Examiner*—Patrick F. Brinson
*Attorney, Agent, or Firm*—Brown, Pinnisi & Michaels

[57] ABSTRACT

A low friction slip-sleeve wrap for buried structures such as pipelines, pilings or the like. The pipe is coated in a polymer coating such as HDPE or FBE, then wrapped in a polymer mesh such as geonet or geogrid without any friction-increasing means such as friction coatings or fillings or bonding of layers. Finally, a layer of geotextile is wrapped over the polymer mesh layer. In addition to the reduction of friction and shear transfer from the ground to the pipe or foundation element, which acts to protect the structure from damage due to earthquakes or land slippage, the low friction slip-sleeve wrap of the invention has several other advantages. The porosity of the geotextile allows for cathodic protection. The geogrids, geonets, and geotextiles used in the wrap are relatively inexpensive and readily available. Moreover, the wrap can be applied in the field easily, with minimal time delay, and located as required along all or selected lengths of the pipeline or foundation element. Because the wrapping can be applied easily in sections, it also can be used on large conduits, including large diameter water pipelines (greater than 4 ft) and tunnels.

20 Claims, 1 Drawing Sheet

LOW FRICTION SLIP-SLEEVE PIPE WRAP

REFERENCE TO RELATED APPLICATIONS

This is a continuation-in-part patent application of application Ser. No. 08/534,631, filed Sep. 27, 1995 now abandoned.

FIELD OF THE INVENTION

The invention pertains to the field of low friction coverings for buried structures. More particularly, the invention pertains to methods of earthquake and ground movement protection for underground pipelines and the like.

BACKGROUND OF THE INVENTION

There are literally hundreds of thousands of pipelines constructed each year. A small, but significant, portion of them need protection against potential large ground deformation at fault crossings, landslides, and areas vulnerable to soil liquefaction. A large factor in the damage done to pipelines by these problems is caused by the friction between the pipeline and the surrounding fill, and damage can be lessened by decreasing this friction.

Pipes are currently being coated or wrapped in polymers such as FBE (Fusion Bonded Epoxy), urethane, or HDPE (High Density Polyethylene) for the purpose of corrosion control.

Geonets and geogrids are examples of polymer meshes available commercially for subsurface drainage and soil reinforcement, respectively. Geotextiles are fabrics commercially available used for hydraulic engineering, erosion control and soil containment.

The 1991 patent to Marienfeld, U.S. Pat. No. 5,056,960 "LAYERED GEOSYSTEM AND METHOD" is for a landfill lining system using geotextile and geonet. The goals of a landfill lining are very much different than the goals of the slip sleeve wrap of this invention, and as a result, the Marienfeld patent actually teaches away from the present invention. The basis of the present invention is the promotion of slip between the pipe and surrounding ground. The Marienfeld patent depends on the prevention, not the promotion, of slip between both geonets and geotextiles and underlying impervious membranes.

The landfill lining system of Marienfeld (FIG. 3) uses a geonet on top of a friction-treated geotextile that is in friction-enhanced contact with an underlying membrane. As a leachate collection layer, the open-work structure of the geonet allows leachate to be carried laterally to various drainage pipes distributed through the landfill. As implied in the patent, it is highly undesirable for the geonet to slip or skid on the surface of the underlying membrane, and the Marienfeld patent states repeatedly, and claims in all claims, that the fabric layer must be friction treated to prevent slip.

In contrast, the slip sleeve wrap of the present invention is designed to take advantage of the very low friction that exists between both geonets and geogrids and the smooth surfaces of relatively hard polymers. The point is that slip between the geonet and underlying coated surfaces of the pipe is essential to the proper operation of this invention, whereas it is highly undesirable in the landfill lining system. In fact, the low friction characteristics of a geonet on a polyethylene membrane would prohibit the landfill lining system from functioning properly. Accordingly, the Marienfeld patent provides for friction-treated geotextiles (FIGS. 2 and 3) to promote friction and eliminate slip.

The landfill lining uses a polyethylene or other impervious liner to act as a barrier to the outward migration of landfill leachate. In contrast, the slip sleeve wrap uses a polyurethane, polyolefin, or epoxy coating which all hazardous pipelines are required to have under the appropriate regulatory provisions of 49 CFR §192. The intention of this invention is to incorporate the characteristics of pipelines, as they would be built under current regulations, into the actual low friction wrap.

Stark, U.S. Pat. No. 5,501,753 "STABILIZED FLUID BARRIER MEMBER AND METHOD FOR MAKING AND USING SAME", like Marienfeld, is a stabilized fluid barrier (landfill liner) in which a priority is "substantially preventing displacement of the barrier material" in the inclined sides of the landfill, as opposed to Applicant's promotion of slip between the pipeline coating and the overlayers. The layers of Stark are bonded together to prevent slip (see col. 5, lines 20–40), Applicant's layers are independent and expected to slip.

Butts, "PIPELINE SECONDLY CONTAINMENT SYSTEM AND METHOD", U.S. Pat. No. 5,176,025, shows a method of pipeline containment which claims to reduce damage due to earth movement. The pipeline is wrapped in geotextile impregnated with hydrated lime, then covered with a rigid HDPE sleeve. The sleeve is wrapped in an outer geotextile layer. There is no use of geonet or geogrid, and the pipe is not coated in HDPE. The rigid HDPE sleeve, in contrast to the coating of the invention, provides corrosion protection only until it is breached, at which point moisture has free access to the pipe. This is the reason for the inner hydrated lime impregnated geotextile layer with leak sensors. The outer geotextile layer has a much higher coefficient of friction against the rigid sleeve than the geogrid of the invention. Butts does not use an HDPE coating on the pipe, but rather a rigid HDPE sleeve, with hydrated lime in the interstitial space. There is a geotextile over the sleeve, but no geonet/geogrid layer. The distinction between Butts' HDPE sleeve and the Applicant's HDPE coating is important—the HDPE sleeve prevents the cathodic protection which the porous geotextile/geogrid of the Applicant's invention makes possible. Also, the coefficient of friction between the geotextile and the sleeve is not low enough to provide the low-friction protection of Applicant's coating/geonet/geotextile system.

Titus, U.S. Pat. No. 4,338,044, "PREVENTION OF SLIDING OF WEIGHT JACKET OVER THE CORROSION COATING OF A PIPE LINE", is a system of using a weight jacket to hold pipelines down. A spiral gripping means is wrapped around the pipeline to prevent slippage between the weight jacket and the pipeline. Titus discloses, col. 1, lines 26–33 that synthetic polymeric coatings such as fusion bonded epoxy or polyethylene both provide smooth surfaces to pipe surfaces allowing jackets and such to slide thereon. As noted above, these polymer pipe coatings which were known to the art before the invention are, in fact, required by regulation. However, Titus then goes on to teach away from the invention by indicating that this sliding characteristic is undesirable and presenting a method to prevent sliding of the jacket over the pipe coating, as is indicated by the title of the invention and described in the the patent. This is consistent with Marienfeld and with the other prior art, but exactly opposite the teachings of the present invention. Titus lacks the geonet/geogrid and geotextile layers of the subject invention, as well.

In addition to pipelines, there are hundreds of thousands of linear feet of piles and caissons installed each year as deep foundations for high-rise buildings, transportation facilities, and various other structures. Substantial savings can be realized for many of these installations by reducing frictional dragdown.

SUMMARY OF THE INVENTION

The low friction or "slip-sleeve" wrap of the invention reduces the friction and shear transfer from the surrounding ground to a pipeline to a very low value. The pipeline is coated in an epoxy or polyethylene coating, then directly wrapped in a layer of polymer mesh material such as geonet or geogrid, without the addition of any friction-increasing components such as friction coatings or fillings or bonding of layers. Finally, the mesh is wrapped in an outer layer of geotextile to minimize dirt infiltration into the grid. The geonet/grid presents a very low friction sliding interface to the pipe coating, and thus between the pipe and the ground. No additional material is introduced which would increase the friction between the layers.

Laboratory tests have disclosed that the coefficient of friction between a polyethylene coating and geonet or geogrid can be as low as 0.1, which is 5 to 10 times smaller than the coefficient of friction that normally would exist between pipe or pile and the ground.

The geotextile also provides a porous covering so that groundwater and soil moisture can penetrate the wrapping. The porous nature of the covering is essential for cathodic protection because it allows electrolyte penetration of the cover, thus permitting electric current to be impressed on the pipeline or pile.

In addition to the reduction of friction and shear transfer from the ground to the pipe or foundation element, the slip-sleeve wrap has several other advantages. As already mentioned, it allows for cathodic protection. The geogrids, geonets, and geotextiles used in the wrap are relatively inexpensive and readily available. Moreover, the wrap can be applied in the field easily, with minimal time delay, and located as required along all or selected lengths of the pipeline or foundation element. Because the wrapping can be applied easily in sections, it also can be used on large conduits, including large diameter water pipelines (greater than 4 ft) and tunnels.

DESCRIPTION OF THE PREFERRED EMBODIMENT

It should be noted that the use of the 'frictionless' pipe wrap should only be considered when suspected pipe/soil differential movements are purely longitudinal. As the pipe wrap increases the effective pipeline diameter, any pipeline loading realized from a lateral soil movement component would be proportionately increased due to the increased pipe diameter and increased friction between the outer geotextile and the backfill soil.

Figure 1:
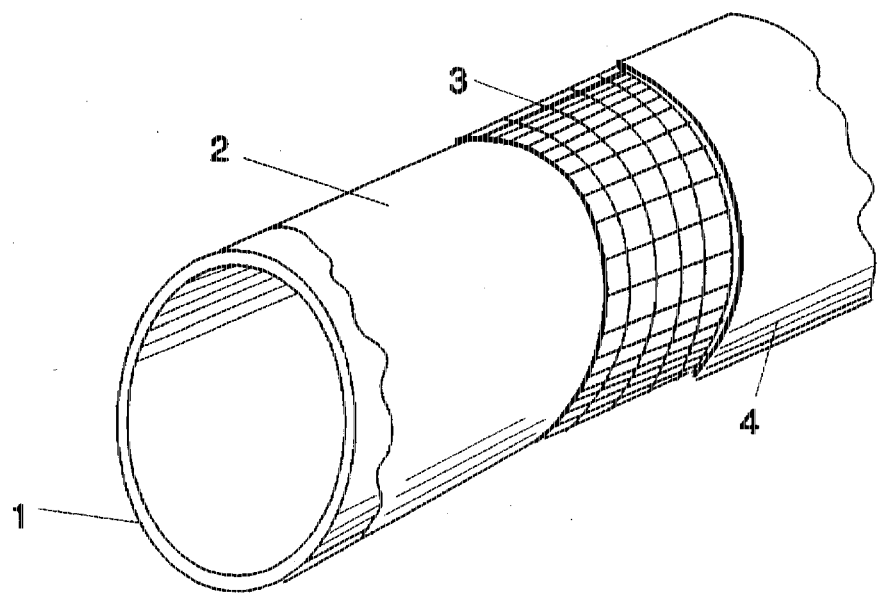
FIG. 1 shows a pipeline protected by the wrap of the invention.

FIG. 1 shows the application of the invention to a pipeline (1).

The pipeline (1), conventionally made of steel (although the invention would be applicable to any other material), is coated in a coating of a polymer (2). This polymer is preferably High Density Polyethylene (HDPE) or Fusion Bonded Epoxy (FBE), which are currently the most commonly used pipeline coatings, but other polymers or similar coatings which present a low coefficient of friction would be usable. The coating (2) both creates a lower friction surface for the pipeline (1) than the steel or other material of which it is made, but also reduces corrosion by protecting the pipe from groundwater.

Further corrosion protection is often provided for pipelines by a system known as "cathodic protection," in which an electric current is imposed between the pipeline, as cathode, and a "sacrificial electrode" implanted in the soil as anode. In this method, similar to electroplating, the current causes the sacrificial anode to erode, protecting the pipeline cathode. In order for this method to work, the cathodic protection must deal only with "holidays", or exceptions to the general protection of the pipeline by the moisture impervious HDPE coating.

Over the pipeline coating (2), the pipeline is directly wrapped in a layer of a polymer mesh material (3). As noted above, Geonets and geogrids are polymer meshes available commercially for subsurface drainage and soil reinforcement, respectively. The geonet or geogrid presents a very low friction sliding interface to the pipe coating, and thus between the pipe and the ground. Laboratory tests have disclosed that the coefficient of friction between a polyethylene coating and geonet or geogrid can be as low as 0.1, which is 5 to 10 times smaller than the coefficient of friction that normally would exist between pipe or pile and the ground. No friction-increasing components such as friction coatings or fillings or bonding of layers is used to defeat the low-friction interface.

Geogrids are manufactured by a number of companies, such as The Reinforced Earth Co., or The Tensar Corp. A particularly useful geogrid would be Tensar model UX1400, a Polyethylene grid material manufactured in a punched, sheet drawn process, available in rolls 13 meters wide by 30 meters long. UX1400 is normally recommended by the manufacturer for use in reinforcing walls, slopes and embankments.

Geonets are also available from a number of manufacturers, such as National Seal Co., or Tensar. The Tensar model NS1305 geonet would be useful with the invention. NS1305 is a geonet material made of MDPE (Medium Density Polyethylene), available in 91 meter rolls, 4.2 meters wide, with a 4 mm thickness.

Finally, the polymer mesh layer is covered in a wrapping of geotextile (4) to minimize dirt infiltration into the grid, which would increase the friction between the pipe and the geonet/grid and reduce or eliminate the benefits of the invention. Geotextiles are fabrics commercially available used for hydraulic engineering, erosion control and soil containment. They are available either woven or non-woven, and either kind is applicable to the invention.

The geotextile also provides a porous covering so that groundwater and soil moisture can penetrate the wrapping. The porous nature of the covering is essential for cathodic protection because it allows electrolyte penetration of the cover, thus permitting electric current to be impressed on the pipeline or pile. In contrast, Butts' rigid HDPE sleeve is impervious to electrolyte penetration, and would shield the pipeline from impressed current, thus eliminating the benefits of cathodic protection.

Geotextiles are available from many manufacturers, including Amoco Fibers and Fabrics Co., Belton Industries, inc., Bradley Industrial Textiles, inc., and Nilar Geotechnical Products. A very good geotextile for use with the invention would be the Amoco 4551 product, a non-woven polypropylene fabric available in 4.5 meter wide rolls, 91 meters in length.

Much of the prior art has been dedicated to eliminating the low-friction effect which is the basis of the current invention. Where the geonet/geogrid material is used with geotextile, layers are bonded together or additional substances introduced which would limit slippage and increase friction. In the invention of the Butts patent, the HDPE sleeve has a much higher coefficient of friction against the geotextile impregnated with hydrated lime. Marienfeld adds a friction coating to reduce slip, Stark bonds the layers together, and so on. In the current invention, the low-friction interface between geogrid and coating is retained by the layers used.

In addition to the reduction of friction and shear transfer from the ground to the pipe or foundation element, the low friction slip-sleeve wrap of the invention has several other advantages. As already mentioned, it allows for cathodic protection. The geogrids, geonets, and geotextiles used in the wrap are relatively inexpensive and readily available. Moreover, the wrap can be applied in the field easily, with minimal time delay, and located as required along all or selected lengths of the pipeline or foundation element. Because the wrapping can be applied easily in sections, it also can be used on large conduits, including large diameter water pipelines (greater than 4 ft) and tunnels.

TEST RESULTS

A test program conducted at the NOVA Gas Transmission Ltd. Airdrie Service Center consisted of pushing variously coated NPS 16 pipeline segments through different backfill materials and measuring the load versus displacement curves. Several test lanes were configured to investigate the low friction pipe wrap design of the invention. Three product combinations were tested over coated NPS 16 pipe segments coated in FBE (Fusion Bond Epoxy), a conventional pipe coating:

TENSAK UTX1100 "Snow Fence" geogrid (from TENSAK Canada) covered by NILEX PS300 non-woven geotextile (from NILEX Geotechnical Products)

TENSAK BX1100 "Geogrid" covered by NILEX PS300 nonwoven geotextile, and

TENSAR "Rock Shield" geogrid covered by NILEX 4553 non-woven geotextile.

The ultimate shear resistance for the various combinations were calculated using the following method based on the procedure suggested by Ligon and Mayer, *Pipeline Rules of Thumb Handbook*, 3rd Edition, 1993, pp.157–159:

$$T_u = \mu(2\gamma DH + W_p) \quad (1)$$

Where:
$T_u$=Ultimate Shear Resistance (kN/m)
$\mu$=Coefficient of friction between pipe wrap and pipe surface
$\gamma$=Backfill unit soil density (kg/m$^3$)
D=Nominal Pipe Diameter (m)
H=Depth of Cover (m)
$W_p$=Weight of pipe per meter (kg/m), calculated as follows:

$$W_p = \delta_s \pi g \left[ \left(\frac{D}{2}\right)^2 - \left(\frac{D}{2} - WT\right)^2 \right] \quad \text{[equation 2]}$$

where:
$\delta_g$=Steel density (kg/m$^3$)
g=Gravitational acceleration (m/s$^2$)
WT=Pipe wall thickness (m)

Substituting equation 2 into equation 1 gives the following calculation for the coefficient of friction:

$$\mu = \frac{T_u}{(2\gamma DH + W_p)} = \frac{T_u}{\left[2\gamma DH + \left(\delta_s \pi g \left[\left(\frac{D}{2}\right)^2 - \left(\frac{D}{2} - WT\right)^2\right]\right)\right]}$$

For the test using a 16" (0.4046 m) pipe, coated with FBE, wrapped in TENSAR Pipeshield Plus "Rock Shield" geogrid, and then covered by NILEX 4553 non-woven geotextile, the following values can be used to calculate the coefficient of friction:

$T_u$=4.48 kN/m  $\gamma$=20.0 kN/m$^3$  $\delta_s$=7250 kg/m$^3$
H=1.0 m  D=0.4064 m  WT=0.0056 m
g=9.81 m/s$^2$ This analysis indicates that a friction coefficient of 0.2673 can be used to represent geotextile covered "Rock Shield" wrapped pipe in design applications. Using this friction coefficient value and the analysis procedure outlined above, ultimate loads for "frictionless" pipe wrapped pipelines can be calculated and compared to those for unwrapped pipelines in pipe/soil interaction pipeline integrity analysis. Thus, a basis has been developed to compare design options for potential (or known) unstable slopes.

Calculated ultimate shear resistance values for the tests are presented in Table 1, following. Also included in Table 1 is the test result for unwrapped pipe in the native till backfill for comparison purposes.

As can be seen in Table 1, the geotextile covered "Rock Shield" product (Test 3) had the lowest experimental ultimate shear resistance. Ultimate shear resistance for the "Rock Shield" product was approximately one-third the ultimate load transferred to the pipe by the uncoated pipe/ native till backfill combination. It should be noted that the much higher ultimate shear resistance observed for the first two tests of this product have been attributed to inadvertently installing the pipe wrap over insufficiently cleaned pipeline. The higher ultimate load values are due to interaction of the pipe wrap with clumps of earth adhering to the pipe surface, effectively increasing the pipe wrap/pipe friction coefficient. For the third test, the pipeline segment was meticulously cleaned to better represent conditions expected during actual field application.

TABLE 1

Pipe Cover vs. Ultimate Load

| Pipe Cover over NPS 16" Pipe Coated in FBE (except control) | Test Lane Length (meters) | Depth of Cover (meters) | Measured Ultimate Load (kN) | Normalized Ultimate Load (kN) |
|---|---|---|---|---|
| TENSAR "Rock Shield" geogrid covered by NILEX 4553 Non-Woven Geotextile | 6.5 | 1.0 | 29 | 4.48 |
| TENSAR UTX1100 "Snow Fence" geogrid covered by NILEX PS300 Non-Woven Geotextile | 5.5 | 1.2 | 44 | 7.96 |
| TENSAR UTX1100 "Snow Fence" geogrid covered by NILEX PS300 Non-Woven Geotextile | 5.4 | 1.5 | 48 | 8.91 |
| TENSAR "Rock | 4.7 | 1.3 | 54 | 11.61 |

TABLE 1-continued

Pipe Cover vs. Ultimate Load

| Pipe Cover over NPS 16" Pipe Coated in FBE (except control) | Test Lane Length (meters) | Depth of Cover (meters) | Measured Ultimate Load (kN) | Normalized Ultimate Load (kN) |
|---|---|---|---|---|
| Shield" geogrid covered by NILEX 4553 Non-Woven Geotextile | | | | |
| TENSAR "Rock Shield" geogrid covered by NILEX 4553 Non-Woven Geotextile | 4.7 | 1.3 | 57 | 12.26 |
| TENSAR BX1100 "Geogrid" geogrid covered by NILEX PS300 Non-Woven Geotextile | 5.1 | 1.2 | 68 | 13.28 |
| no cover & uncoated pipe (control) | 5.6 | 1.6 | 88 | 15.83 | source: NOVA Gas Transmission Ltd. Airdrie Service Center Pipe/Soil Interaction Test Facility—tests performed from Aug. 11, 1994 to Nov. 24, 1994

Figure 2:
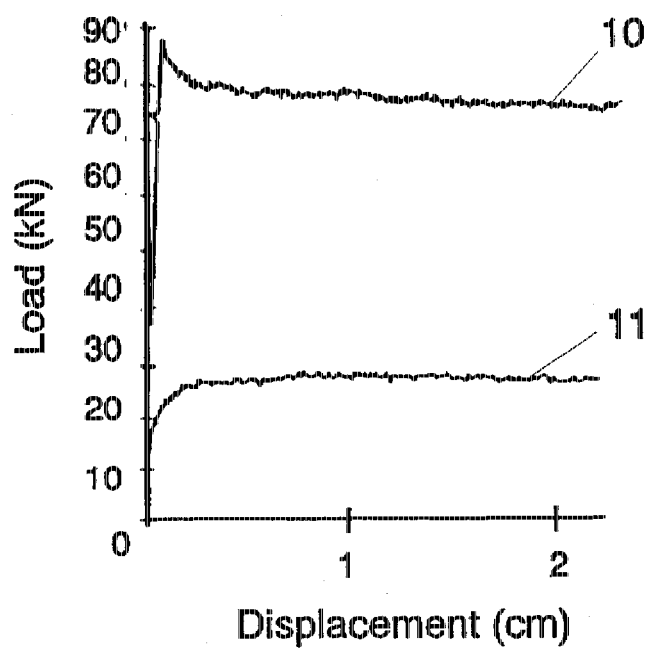
FIG. 2 shows a graph of displacement under load for unprotected and protected pipes.

FIG. 2 shows the results of the test program for the control pipe (10) and the "Rock Shield" (11) combination. They clearly indicate that use of the geotextile covered polymer mesh pipe wrap combination can significantly reduce pipe/soil interaction coupling in the presence of purely longitudinal differential pipe soil displacements.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A low friction wrap for buried structures comprising:
   a) a polymer coating on the structure;
   b) a middle layer of polymer mesh material surrounding the structure coated in the polymer coating; and
   c) an outer layer of geotextile material completely covering the polymer mesh material;
   such that the polymer coating and middle layer of polymer mesh material present a low-friction interface surrounding the buried structure.

2. The low friction wrap of claim 1 in which the buried structure is a pipeline.

3. The low friction wrap of claim 1, in which the polymer coating is high density polyethylene.

4. The low friction wrap of claim 1, in which the polymer coating is fusion bonded epoxy.

5. The low friction wrap of claim 1 in which the polymer mesh material is geonet.

6. The low friction wrap of claim 1 in which the polymer mesh material is geogrid.

7. A method of protecting buried structures comprising the steps of:
   a) coating the structure in a polymer coating;
   b) wrapping the coated structure in polymer mesh material; and
   c) wrapping the polymer mesh material in geotextile;
   such that the polymer coating and polymer mesh material present a low-friction interface surrounding the buffed structure.

8. The method of claim 7 in which the buried structure is a pipeline.

9. The method of claim 7 in which the polymer mesh material is geonet.

10. The method of claim 7 in which the polymer mesh material is geogrid.

11. The method of claim 7, in which the polymer coating is high density polyethylene.

12. The method of claim 7, in which the polymer coating is fusion bonded epoxy.

13. A method of protecting a pipeline, the pipeline being coated in a polymer coating, comprising the steps of:
   a) wrapping the coated pipeline in polymer mesh material; and
   b) wrapping the polymer mesh material in geotextile;
   such that the polymer coating on the pipeline and the polymer mesh material present a low-friction interface surrounding the coated pipeline.

14. The method of claim 13 in which the polymer mesh material is geonet.

15. The method of claim 13 in which the polymer mesh material is geogrid.

16. The method of claim 13, in which the polymer coating is high density polyethylene.

17. The method of claim 13, in which the polymer coating is fusion bonded epoxy.

18. The method of claim 13, further comprising the step, before step a), of cleaning the coated pipe to remove all earth adhering thereto.

19. A low friction wrap for buried structures comprising:
   a) a polymer coating on the structure;
   b) a middle layer of polymer mesh material directly surrounding the structure coated in the polymer coating without means for increasing friction; and
   c) an outer layer of geotextile material completely covering the polymer mesh material;
   such that the polymer coating and middle layer of polymer mesh material present a low-friction interface surrounding the buried structure.

20. A method of protecting buried structures comprising the steps of:
   a) coating the structure in a polymer coating;
   b) wrapping the coated structure directly in polymer mesh material without means for increasing friction; and
   c) wrapping the polymer mesh material in geotextile;
   such that the polymer coating and polymer mesh material present a low-friction interface surrounding the buried structure.

* * * * *